United States Patent [19]

Charbonneau

[11] 4,429,105

[45] Jan. 31, 1984

[54] PROCESS FOR PREPARING A POLYESTER OF HYDROXY NAPHTHOIC ACID AND HYDROXY BENZOIC ACID

[75] Inventor: Larry F. Charbonneau, Chatham, N.J.

[73] Assignee: Celanese Corporation, New York, N.Y.

[21] Appl. No.: 468,240

[22] Filed: Feb. 22, 1983

[51] Int. Cl.³ .................... C08G 63/08; C08G 63/10
[52] U.S. Cl. .................... 528/207; 528/166; 528/180; 528/181; 528/190; 528/206; 528/271
[58] Field of Search ............... 528/166, 180, 181, 190, 528/271, 206, 207

[56] References Cited

U.S. PATENT DOCUMENTS

| | | | |
|---|---|---|---|
| 4,161,470 | 7/1979 | Calundann | 528/190 |
| 4,219,461 | 8/1980 | Calundann | 528/190 |
| 4,256,624 | 3/1981 | Calundann | 528/190 |
| 4,337,190 | 6/1982 | Calundann | 528/190 |
| 4,355,133 | 10/1982 | East et al. | 528/190 |
| 4,355,134 | 10/1982 | Charbonneau et al. | 528/190 |
| 4,359,569 | 11/1982 | Siemionko | 528/190 |
| 4,370,466 | 1/1983 | Siemionko | 528/190 |

*Primary Examiner*—Lester L. Lee
*Attorney, Agent, or Firm*—Burns, Doane, Swecker & Mathis

[57] ABSTRACT

Provided is a method for preparing aromatic copolyesters of hydroxy naphthoic acid and hydroxy benzoic acid via an in situ esterification technique whereby there is no isolation of the esterified monomers. The process comprises reacting the aromatic hydroxy acid monomers with an agent such as acetic anhydride in order to esterify the hydroxy moieties and subsequently polymerizing the esterified hydroxy monomers without isolation thereof, all in the presence of from about 5 to 50 ppm iron. Advantageously, the process allows one to obtain a wholly aromatic polyester of high inherent viscosity and good melt stability while avoiding the time consuming step of having to isolate the esterified hydroxy monomers prior to polymerization.

15 Claims, No Drawings

PROCESS FOR PREPARING A POLYESTER OF HYDROXY NAPHTHOIC ACID AND HYDROXY BENZOIC ACID

BACKGROUND OF THE INVENTION

1. Field of the Invention

The present invention relates to a process for preparing wholly aromatic polyesters involving the in situ esterification of aromatic hydroxy moieties. The present invention also pertains to a process for preparing wholly aromatic polyesters via the use of iron catalysts. More specifically, the present invention pertains to a process for preparing a polyester from hydroxy naphthoic acid and hydroxy benzoic acid monomers by first acetylating the monomers and then subsequently polymerizing the acetylated monomers in the presence of an iron catalyst without first isolating the resulting acetate monomers.

2. Description of the Prior Art

Wholly aromatic polyester resins, with the aromatic polyester being considered to be "wholly" aromatic in the sense that each moiety present contributes at least one aromatic ring to the polymer backbone, have long been known. For instance, 4-hydroxybenzoic acid homopolymer and copolymers have been provided in the past and are commercially available. Representative publications which discuss wholly aromatic polyesters include: (a) "Polyesters of Hydroxybenzoic Acids," by Russell Gilkey and John R. Caldwell, *J. of Applied Polymer Sci.*, Vol. II, Pages 198 to 202 (1959), (b) "Polyarylates (Polyesters From Aromatic Dicarboxylic Acids and Bisphenols)," by G. Bier, *Polymer*, Vol. 15, Pages 527 to 535 (August 1974), (c) "Aromatic Polyester Plastics," by S. G. Cottis, *Modern Plastics*, Pages 62 to 63 (July 1975); and (d) "Poly(p-Oxybenzoyl Systems): Homopolymer for Coatings: Copolymers for Compression and Injection Molding," by Roger S. Storm and Steven G. Cottis, *Coatings Plast. Preprint*, Vol 34, No. 1, Pages 194 to 197 (April 1974). See also, U.S. Pat. Nos. 3,039,994; 3,169,121; 3,321,437; 3,553,167; 3,637,595; 3,651,014; 3,723,338; 3,759,870; 3,767,621; 3,778,410; 3,787,370; 3,790,528; 3,829,406; 3,890,256; and 3,975,487.

Publications disclosing certain polyesters which exhibit melt anisotropy include (a) "Polyester X7G-A Self Reinforced Thermoplastic," by W. J. Jackson, Jr., H. F. Kuhfuss, and T. F. Gray, Jr., 30th Anniversary Technical Conference, 1975 Reinforced Plastics/Composites Institute. *The Society of the Plastics Industries, Inc.*, Section 17-D, Pages 1 to 4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,169,933; 4,181,792; 4,183,895; 4,188,476; 4,189,996; 4,201,856; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,267,304; 4,269,965; 4,279,803; 4,287,332; 4,294,955; 4,299,756; 4,318,842; 4,337,190; 4,337,191; and (g) U.K. Application No. 2,002,404.

Additionally, commonly assigned U.S. Pat. No. 4,161,470 claims a polyester of 6-hydroxy-2-naphthoic acid and para-hydroxy benzoic acid, and in commonly assigned U.S. Pat. No. 4,219,461 is claimed a polyester of 6-hydroxy-2-naphthoic acid, para-hydroxy benzoic acid, aromatic diol, and aromatic acid. Each of these polyesters exhibits an anisotropic melt phase and is capable of readily undergoing melt processing to form quality fibers, molded articles, etc.

Several procedures are known for preparing aromatic polyesters of fiber-forming molecular weight, including the direct polymerization procedure of U.S. Pat. No. 4,093,595. One commonly employed procedure involves thermally reacting aromatic acetate moieties with aromatic carboxylic acid moieties. In other words, the aromatic hydroxy groups are acetylated.

U.S. Pat. No. 4,311,823 describes such a process wherein aromatic polyesters are prepared by bulk condensation by using three reaction vessels. In the first reaction vessel, the polyester forming reactants are first reacted with an acid anhydride, e.g., acetic anhydride, to effect an alkanolylation reaction. Separation of excess acid anhydride and the acids byproduced in said reaction is then effected. An oligomer may then be formed from a part or all of the acetylated reactants, with transfer of the reaction product of the first vessel then being made to the second vessel. A prepolymerization reaction is then carried out in the second vessel, with the prepolymer product being transferred to a third vessel for polymerization to the final product.

The use of acetylated reactants has been of utmost importance when preparing a polyester of an aromatic hydroxy acid since such compounds tend to readily decarboxylate. For example, p-hydroxy benzoic acid is notorious for severe decarboxylation upon attempted direct esterification polymerization.

Several effective acetylating agents are known for the esterification of aromatic hydroxy polyester monomers prior to polymerization, with acetic anhydride being the agent used foremost. Generally, when employing acetic anhydride, the aromatic hydroxy moieties are initially acetylated in a vessel other than the polymerization vessel. Upon completion of the reaction, the acetylated hydroxy monomers are separated from the reaction mixture and then transferred to the polymerization vessel for polymerization between the acetate moieties and aromatic carboxylic acid moieties. The separate acetylation reaction followed by the separation and isolation of the acetylated hydroxy monomers has been found necessary due to the deleterious effects resulting from conducting the polymerization in the acetylation reaction mixture. However, the operation of separating or isolating acetylated aromatic hydroxy monomers prior to polymerization is time consuming and economically wasteful.

Processes have been disclosed wherein in situ acetylation with acetic anhydride has been conducted, for example, directly in the polymerization vessel. See, for example, U.S. Pat. Nos. 3,637,595 and 3,975,487 issued to Cottis et al wherein hydroxy benzoic acid, an aromatic diacid and aromatic diol are refluxed for an extended period of time at elevated temperatures in the presence of acetic anhydride. The quality of the resultant polymer, however, is generally less than that desired with respect to the polymer's inherent viscosity and thus its ability to provide high strength and high modulus fibers.

In Great Britain Pat. No. 2,061,304 is disclosed a process wherein an aromatic dicarboxylic acid, a hydroxy aromatic acid and a dihydroxy aromatic compound containing a major proportion of 4,4'-dihydroxydiphenyl are reacted and polymerized in the presence of acetic anhydride. Specifically, the 4,4'-dihydroxydiphenyl employed is of a quality such that a solution of 1 part by weight thereof in 100 parts by weight of a 70:30 by weight mixture of methanol and water has a pH value within the range of from 6.6 to 7.4. By employing 4,4'-dihydroxydiphenyl of such quality, it is disclosed that a polyester having little discoloration and excellent thermal resistance can be obtained.

Ever present and ongoing, however, is the need and search for more efficient processes of preparing wholly aromatic polyesters having a satisfactory inherent viscosity, e.g., greater than 5, and thus an ability to produce fibers of high strength and high modulus, but without the time-consuming and economic disadvantages of having to separate and isolate acetylated monomers prior to the polymerization thereof. In particular, such a direct and efficient process would be most desirable for the preparation of valuable wholly aromatic polyesters exhibiting a melt anisotropy such as those claimed in U.S. Pat. No. 4,161,470.

Accordingly, it is an object of the present invention to provide a novel, effective and economically advantageous process for preparing wholly aromatic polyesters involving the initial esterification, and in particular, acetylation, of aromatic hydroxy moieties.

Yet another object of the present invention is to provide a process for preparing wholly aromatic polyesters having a high I.V. when using esterified reactants wherein the isolation and separation of the esterified reactants prior to polymerization is unnecessary.

It is another object of the present invention to provide an economic yet effective process for preparing wholly aromatic polyesters when using esterified, and in particular acetylated reactants, wherein but a single reaction vessel may be employed.

Still another object of the present invention is to provide a process for preparing wholly aromatic polyesters of good melt stability and suitable inherent viscosity so as to provide relatively high strength and high modulus fibers wherein the polymerization reaction can be effectively conducted in the reaction mixture resulting from the initial acetylation of aromatic hydroxy moieties. In other words, it is an object of the present invention to provide an economically advantageous process for preparing polyesters involving an essentially in situ acetylation of aromatic hydroxy moieties, i.e., requiring no isolation or separation of the acetylated reactants prior to polymerization, but which is still most effective in producing a high quality polyester capable of producing high quality fibers.

These and other objects, as well as the scope, nature and utilization of the invention, will be apparent to those skilled in the art from the following description and the appended claims.

SUMMARY OF THE INVENTION

It has now surprisingly been found that wholly aromatic polyesters of hydroxy naphthoic acid and hydroxy benzoic acid moieties can be prepared having good melt stability and high inherent viscosities, e.g., greater than five, via a process involving essentially the in situ esterification of aromatic hydroxy moieties. The process thereby allows one to overcome the problem of having to isolate and separate the acetylated reactants prior to polymerization, without sacrificing polymer properties in terms of the inherent viscosity of the polyester and hence the strength and modulus of the fibers prepared therefrom.

The process of the present invention comprises reacting a hydroxy naphthoic acid and hydroxy benzoic acid with an esterification agent such as acetic anhydride in the presence of from about 5–50 ppm iron, under reaction conditions sufficient to esterify the aromatic hydroxy moieties. Once the esterification has been completed, polymerization is conducted without any isolation or purification of the esterified monomers. The esterification and polymerization reactions can be conducted in the same or different vessels. It is important, however, that both the esterification and polymerization reactions are conducted in the presence of from about 5 to about 50 ppm iron in order to obtain a high I.V., high quality polyester product.

In a preferred embodiment of the present invention, acetic anhydride is employed as the esterification agent in an amount ranging from 97.5 to about 102.5 molar percent of the stoichiometric amount of acetic anhydride required for reaction with the hydroxy naphthoic acid and hydroxy benzoic acid monomers. Employing acetic anhydride in amounts within the aforenoted range has been found to minimize decarboxylation of the hydroxy acids and result in excellent polyester products.

DESCRIPTION OF THE PREFERRED EMBODIMENTS

The process of the instant invention allows one to prepare high quality and high I.V. polyesters, e.g., having an I.V. greater than 5 and a capability of readily providing high strength and high modulus fibers, while avoiding the need to perform any time consuming separation step with regard to the esterified monomer products prior to polymerization. The process, therefore, essentially involves an in situ esterification.

The esterification and polymerization reactions of the present invention are conducted in the presence of small amounts of iron. While it has generally been understood in the art that the presence of iron is detrimental to the polyester being formed and thus should be avoided if possible, by the present invention it has surprisingly been found that iron within a specified range is actually beneficial in the direct esterification/acetylation reaction of the present invention. More specifically, the amount of iron should be from 5 to about 50 ppm, more preferably from about 10 to about 30 ppm, and most preferably from 10 to about 20 ppm of iron. The iron employed can be in any suitable form, e.g., in a complex such as ferrous acetate or as iron powder, with ferrous acetate being the preferred source of iron. It is only important that the amount of iron per se employed be from about 5 to 50 ppm, with the remaining components of the iron form used being essentially irrelevant, in order to obtain the benefits of the present invention. Too little iron will not result in a high I.V. polyester product, while greater than 50 ppm iron generally results in a polyester product which exhibits a melt stability which deteriorates unusually rapidly with temperature, and overall indicates a less stable polymeric product. Thus, in order to obtain a polyester product of high I.V. and high quality, it is generally important to observe the range of from about 5 to about 50 ppm iron. The amount of iron in the final polymer can be monitored and measured through the use of such conventional techniques as atomic absorption spectroscopy.

While it is preferred to add a source of iron directly to the reaction mixture so that the amount of iron present can be accurately assessed, the iron can also be obtained from the reaction vessel in which the esterification and/or polymerization are conducted. Thus, if an iron-containing vessel is employed, for example, such as a 316 stainless steel vessel, a certain amount of iron will leach from the vessel. Provided this amount is not in excess of about 50 ppm, the vessel may be the sole source of iron. However, it can be rather difficult determining how much iron will leach from the vessel during each reaction, thereby making reliance on iron obtained from a vessel somewhat unpredictable. Simply adding an iron source, therefore, is preferred. When employing an iron-containing vessel, however, some consideration should be given to the amount of iron which may be added to the reaction mixture from the vessel when calculating the amount of iron source to add directly. When using a conventional glass reactor or Hastelloy B reactor whereby little or no iron would leach from the reactor vessel, of course, the sole source of the iron would essentially be that which is added directly.

The esterification agent employed in the present invention can be any suitable esterification agent, with acetic anhydride being the most preferred for practical reasons such as cost and availability. When acetic anhydride is employed, it is also most preferred that the amount of acetic anhydride be in the range of from 97.5 percent to about 102.5 percent of stoichiometry, i.e., the amount of acetic anhydride necessary to acetylate the hydroxy naphthoic acid and hydroxy benzoic acid monomers. It has been found that best results are obtained when the amount of acetic anhydride used is in the aforenoted range, with the yields being generally improved and the quality of polymer high, as well as little or no decarboxylation of the hydroxy benzoic acid occurring. For when the amount of acetic anhydride employed in conjunction with the present invention is greater than 102.5 percent of stoichiometry, the color of the resulting polymer is severely increased and the product can have mixed anhydride impurities effecting its quality. Below 97.5 percent of stoichiometry, severe decarboxylation of hydroxy benzoic acid occurs thereby effecting the final yield of polymer as well as its final composition.

The esterification of the hydroxy naphthoic acid and hydroxy benzoic acid monomers is conducted in the presence of from 5 to about 50 ppm of iron, but otherwise is conducted in accordance with conventional techniques. For example, when employing acetic anhydride, the temperature at which the esterification reaction is conducted is generally in the range of from about 120° to 150° C. The esterification reaction is generally conducted until the esterification is essentially complete, i.e., until all of the agent (e.g., acetic anhydride) or hydroxyl moieties have reacted. Generally, the period of time ranges from about one to five hours, and most preferably from one to three hours. Preferably, the initial reaction-temperature is below 120° C. and raised to about 120° C. over a period of about one hour. The reaction temperature is then maintained in the range of from about 120° to 150° C. for the next two hours.

The esterification can be conducted in the presence of a catalytic amount, i.e., an amount sufficient to increase the rate of esterification, of a conventional esterification catalyst, provided the catalyst does not interfere with or react with the iron. As well, the esterification reaction can be conducted in the presence of an organic solvent. Any of the conventional, hydrocarbon organic solvents are suitable, for example, xylene, mesitylene, Decalin, decane, Therminol TM etc., with alkyl aromatic hydrocarbon solvents such as xylene being preferred. When selecting a solvent, it is important to remember that the solvent medium will not only be used in the esterification reaction, but may also be present during the polymerization reaction. Thus, the solvent chosen should not adversely effect the polymerization reaction. A solvent such as Therminol 66, which is known to be useful as a polymerization medium, e.g., see U.S. Pat. No. 4,067,852, maintans a fluid medium between the esterification reaction and polymerization and thereby would be an appropriate solvent medium for the purposes of the present invention. It is preferred, however, that a solvent not be employed in the present invention.

An inert gas purge, e.g., with nitrogen or argon, can be employed during the esterification reaction in order to minimize oxidation. This purge can be, and is preferably, continued through the polymerization reaction. Removal and condensation of evolved gases during the esterification and/or polymerization reactions can also be accomplished easily with conventional equipment such as a distillation head and condenser. Acetic acid removal is particularly prevalent since acetic acid is a volatile by-product of the acetylation reaction between acetic anhydride and an aromatic hydroxy moiety.

Once the esterification reaction has been completed, the polymerization reaction can be initiated immediately. Complete initiation of the polymerization can be readily achieved by simply raising the reaction temperature to a temperature greater than 180° C., e.g., in the range of from about 180° C. to about 350° C., and most preferably in the range of from about 220°-340° C. Since no isolation of the esterified monomers is effected, the iron present during the esterification reaction remains present during the polymerization reaction.

In general, the polymerization reaction is conducted under conventional polyester polymerization conditions. The time, temperature and pressure conditions to be employed for optimum results depends on the specific reactants used and on the specifically selected catalyst, if any. It is important, however, that the reactants and the resulting polymer suffer no substantial degradation under the polymerization conditions employed.

It is preferred to conduct the reaction under conventional conditions of melt polymerization, thereby requiring that the polymerization temperature be at least high enough so that at least one of the reactants and the aromatic polyester polymer product are in a melt phase. Temperatures in the range of from about 180° C. to about 400° C. can generally be employed, with a temperature in the range from about 225° C. to about 360° C. being preferred, and a temperature in the range from about 250° C. to about 330° C. being most preferred. Accordingly, when melt polymerization conditions are to be employed, the temperature should be raised to a temperature of at least 225° C., although the initiating polymerization temperature need not be 225° C. However, the temperature should ordinarily not be so great as to cause degradation of the polymer as may be observed from undue darkening of the polymer.

If desired, a vacuum can be applied at a suitable place in the melt polymerization to rapidly remove volatile by-products and to hasten the polymerization after sufficient reaction has taken place so that the loss of reactants through sublimation or other means is minimized.

Other than during the vacuum cycle, the reaction is conducted generally at atmospheric pressure, although this may vary if desired. Also, to minimize oxidation, the reaction can be carried out in an inert atmosphere such as nitrogen, carbon dioxide or argon, in which case the inert gas purge from the acetylation reaction, if employed therein, need only be continued.

Other polymerization techniques, however, e.g., a slurry polymerization such as that described in commonly assigned U.S. Pat. No. 4,067,852 of Gordon W. Calundann, entitled "Melt Processable Thermotropic Wholly Aromatic Polyester Containing Polyoxybenzoyl Moiety" wherein the solid product is suspended in a heat exchange medium, may also be employed. The disclosure of the Calundann patent is herein incorporated by reference.

The reaction can also be conducted in the presence of a catalytic amount of a conventional polymerization catalyst. A catalytic amount is an amount sufficient to increase the rate of polymerization, which can be measured by the inherent viscosity of the resulting polyester. The quantity of catalyst, if utilized, is typically in the range from about 0.001 to about 1 weight percent based upon the total monomer reactant weight, with from 0.005 to about 0.2 weight percent being preferred, and from 0.01 to about 0.1 weight percent being most preferred.

Representative examples of catalysts suitable for use in the reaction are simple substances such as lithium, sodium, potassium, magnesium, calcium, and so on; or compounds of these simple substances and titanium, manganese, cobalt, zinc, tin, antimony, lanthanum, cerium, lead, germanium such as for example their oxides, hydrides, hydroxides, halides, alcoholates, phenolates, organic and inorganic acid salts, complex salts, mixed salts, and so forth. More specifically, there can be exemplified sodium metal, sodium hydroxide, lithium acetate, sodium acetate, potassium acetate, calcium benzoate, calcium acetate, magnesium acetate, titanium tetrabutoxide, titanium tetraphenoxide, manganese acetate, cobalt acetate, cobalt chloride, zinc oxide, stannous acetate, stannous benzoate, antimony trioxide, lanthanum hydroxide, cerium carbonate, lead oxide, germanium oxide, titanium trisacetyl acetonate, etc. Of these compounds, the above-mentioned alkali acetate compounds are particularly preferable.

Acid catalysts such as a sulfonic acid (e.g., p-toluene sulfonic acid and 2-naphthalene sulfonic acid) may also be suitably employed if desired.

When a polymerization catalyst is employed, it can be added at any time, but is preferably added prior to initiation of the polymerization.

The polyester to which the present invention pertains is an aromatic polyester of a hydroxy naphthoic acid and hydroxy benzoic acid. Thus, the hydroxy aromatic acid reactants which are first esterified and subsequently polymerized in the presence of iron in accordance with the present invention comprise at least one hydroxy naphthoic acid and at least one hydroxy benzoic acid.

Suitable hydroxy naphthoic acid reactants in accordance with the instant invention may have some additional substitution on the aromatic rings beside the hydroxy and carboxyl moieties. Such optional substitution may be with substituents inert in the polymerization reaction, e.g., alkyl, alkoxy, aryl, halo and mixtures thereof. When the substituent is an alkyl or alkoxy, it preferably contains from 1 to about 4 carbons. When the substituent is an aryl, it preferably contains from 6 to 10 carbons (e.g., phenyl). When the substituent is a halogen, it is preferably selected from the group consisting of fluorine, chlorine, and bromine. The presence of such ring substituents can tend to modify to some extent the physical properties of the resulting polyester polymer, e.g., the polymer may soften at a lower temperature, its impact strength may be improved, and the crystallinity of the solid polymer formed may be decreased. The specific properties desired in the polyester product will influence the choice of substituents on the hydroxy naphthoic acid reactant. The most preferred hydroxy naphthoic acid is 6-hydroxy-2-naphthoic acid without any further ring substitution, which can be employed to provide a copolyester of optimum crystallinity in the solid state.

Representative examples of substituted hydroxy naphthoic acid reactants include: 6-hydroxy-5-chloro-2-naphthoic acid, 6-hydroxy-5-methyl-2-naphthoic acid, 7-hydroxy-5-methoxy-2-naphthoic acid, 6-hydroxy-7-chloro-2-naphthoic acid, etc., and mixtures thereof.

The amount of hydroxy naphthoic acid employed can vary greatly, but it is generally preferred that the amount be within the range of from about 1 to 90 mole percent of the total monomer reactants. The amount of hydroxy naphthoic acid employed is more preferably, however, in the range from about 15 to 35 mole percent, and most preferably in the range from about 20 to 30 mole percent, e.g., approximately 25 mole percent.

Suitable hydroxy benzoic acid reactants for purposes of the instant invention may also contain some additional substitution on the aromatic ring beside the hydroxy and carboxyl moieties. Such optional substitution may be with substituents inert in the polymerization reaction, e.g., alkyl, alkoxy, aryl, halo and mixtures thereof. When the substituent is an alkyl or alkoxy, it preferably contains from 1 to about 4 carbons. When the substituent is an aryl, it preferably contains from 6 to about 10 carbons (e.g. phenyl). If the substituent is a halogen, it is preferably selected from the group consisting of fluorine, chlorine, and bromine. The presence of such ring substituents can tend to modify to some extent the physical properties of the resulting polyester polymer, as discussed with regard to the hydroxy naphthoic acid reactant. In a preferred embodiment, unsubstituted p-hydroxy benzoic acid is employed in order to provide a resulting copolyester of optimum crystallinity in the solid state.

Representative examples of other suitable hydroxy benzoic acid reactants include m-hydroxy benzoic acid, 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, etc.

The amount of hydroxy benzoic acid employed can vary greatly, but it is preferred that the amount employed be generally within the range of from about 10 to 99 mole percent of the total monomer reactants, more preferably in the range from about 65 to 85 mole percent, e.g., approximately 75 mole percent.

If desired, a mixture of hydroxy benzoic acids may be employed, for example, a mixture of p-hydroxy benzoic acid and m-hydroxy benzoic acid.

The polymerization of the hydroxy naphthoic and hydroxy benzoic monomers is generally conducted until the desired molecular weight (e.g., fiber forming) has been reached. Preferably, the wholly aromatic polyester prepared from the hydroxy naphthoic acid and hydroxy benzoic acid have a weight average molecular weight in the range from about 2,000 to about 200,000, more preferably from about 10,000 to about 50,000, and most preferably from about 20,000 to about 25,000. The molecular weight may be determined by standard techniques not involving the solutioning of the polymer, e.g., by end group determination via infra red spectroscopy on compression molded films. Alternatively, light scattering techniques in a pentafluorophenol solution can be employed to determine the molecular weight.

Advantageously, the inherent viscosity (i.e., I.V.) of the polyester obtained is generally at least 5.0, when determined by dissolving in pentafluorophenol at a concentration of 0.1 percent by weight at 60° C.

Thus, the present invention provides one with a more economically attractive and direct method for preparing a wholly aromatic polyester of a hydroxy naphthoic acid and a hydroxy benzoic acid possessing a high inherent viscosity than has previously been known when utilizing acetylated monomers, yet without having to sacrifice in regard to the quality of the polymer. The need for separately acetylating or otherwise esterifying the hydroxy moieties of the hydroxy naphthoic acid and hydroxy benzoic acid reactants and then isolating same prior to polymerization in order to insure a high I.V. and quality polyester product is avoided by the process of the instant invention. The present invention, therefore, allows one to prepare such a valuable polyester much more cheaply and easily so that the advantages of such polyesters may be more readily exploited.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE 1

A 5-gallon autoclave (constructed of 316 stainless steel) equipped with an anchor type agitator, liquids and solids addition ports, and a distillate take-off column, was charged with 6.65 Kg of 4-hydroxy benzoic acid and 3.35 Kg of 6-hydroxy-2-naphthoic acid. The solids addition port was closed, and the reactor was evacuated to approximately 7 Torr followed by breaking the vacuum with nitrogen. The vacuum-nitrogen purging process was repeated twice more before a vacuum of approximately ½ atmosphere was applied to the reactor. The liquid port was opened and 7.07 Kg of acetic anhydride (Fisher Chemical Reagent Grade) was pulled into the reactor via the vacuum. A 4 SCFH (standard cubic feet per hour) purge of nitrogen was turned on and the batch was heated to 120° C. (via heated oil in the jacket of the autoclave) for one hour, then 50 ppm of 2-naphthalene sulfonic acid (dissolved in 50 ml acetic acid) was added through the liquid addition port.

The batch temperature was raised to 195° C. after approximately 45 minutes to distill off by-product acetic acid, and subsequently raised to 308° C. for the following three hours while additional acetic acid was collected (7.53 Kg, total). The nitrogen purge was then turned off and the autoclave was evacuated to about 6 Torr for one hour. At the end of the one hour vacuum stage, the polymer was extruded and chopped into pellets.

The polymer had an inherent viscosity (I.V.) of 6.99 when measured in pentafluorophenol (0.1% w/v) at 60° C. Atomic absorption spectroscopy (AAS) of the polymer found 23 ppm iron, 11 ppm potassium, and 6 ppm sodium; calculated values for the polymer (based on AAS of the monomers) were 5 ppm sodium, 19 ppm potassium, and 6 ppm iron.

The color of the polymer chip was determined essentially as outlined in the American Associations of Textile Chemists and Colorists Method 153-1978. The L* value (lightness index) was 83.36 and b* (yellowness index) was 18.73.

The polymer pellets were dried (130° C., 24 hours, 1 Torr) and monofilaments were spun through a 7 mil diameter by 10 mil long jet at 320° C. The polymer extrusion rate through the capillary jet was 0.42 g/min and the monofilament was wound up at 800 meters/min. The as-spun fiber properties were: 12.5 g/denier tenacity, 3.0% elongation, 556 g/denier initial modulus; the denier per fil was 5.4.

The monofilaments were then heat-treated in a flowing stream of nitrogen for 15 hours at 280° C. to give fiber properties of: 22.0 g/denier tenacity, 4.38% elongation, 587 g/d initial modulus. When this fiber was subjected to hydrolysis in a sealed tube containing 20 microliters of water and 5 microliters of morpholine for 4 hours at 180° C., its tenacity decreased to 20.1 g/d, corresponding to a 91% retention of properties.

EXAMPLE 2

Several wholly aromatic polyesters were prepared in accordance with the procedure outlined in Example 1, using varying amounts of acetic anhydride and/or naphthalene sulfonic acid. The results are summarized in the following table:

| Run No. | Acetic Anhydride Kg | Naphthalene sulfonic acid, ppm | I.V. dl/g | Sodium ppm | Potassium ppm | Iron ppm | Color L* | Color b* |
|---|---|---|---|---|---|---|---|---|
| 1 | 7.24 | 50 | 5.89 | 8 | 12 | 24 | 81.86 | 20.84 |
| 2 | 6.90 | 0 | 6.42 | 8 | 12 | 29 | 83.59 | 17.22 |
| 3 | 6.90 | 50 | 6.56 | 9 | 12 | 32 | 84.79 | 18.97 |
| 4 | 7.24 | 0 | 6.97 | 10 | 12 | 33 | 81.35 | 23.42 |
| 5 | 6.565 | 0 | 5.85 | 11 | 11 | 20 | 84.36 | 16.63 |
| 6 | 6.565 | 50 | 6.07 | 18 | 12 | 15 | 82.68 | 16.63 |
| 7 | 6.565 | 100 | 6.12 | 19 | 12 | 14 | 84.27 | 17.00 |
| 8 | 6.90 | 100 | 6.49 | 8 | 12 | 12 | 84.01 | 17.14 |
| 9 | 7.24 | 100 | 6.04 | 11 | 11 | 14 | 83.70 | 19.34 |

Average metal contents of polymer examples are: Na = 11 ± 4   K = 12 ± .5   Fe = 22 ± 8

The polymers from Run Nos. 1-9 were spun into monofilaments and heat-treated as described in Example 1, with the tenacity (T), elongation (E) and initial modulus (M) properties being measured. The results are summarized in the following table:

| Polymer of Run No. | As-Spun Properties | | | Heat-Treated Properties | | |
|---|---|---|---|---|---|---|
| | T, g/d | E, % | M, g/d | T, g/d | E, % | M g/d |
| 1 | 13.1 | 3.1 | 616 | 22.1 | 4.19 | 565 |
| 2 | 13.5 | 2.81 | 650 | 24.2 | 5.31 | 523 |
| 3 | 12.5 | 2.82 | 607 | 22.7 | 4.67 | 560 |
| 4 | 12.4 | 3.05 | 599 | 23.2 | 4.69 | 557 |

-continued

| | As-Spun Properties | | | Heat-Treated Properties | | |
|---|---|---|---|---|---|---|
| Polymer of Run No. | T, g/d | E, % | M, g/d | T, g/d | E, % | M g/d |
| 5 | 11.97 | 2.70 | 574 | 18.8 | 3.91 | 489 |
| 6 | 12.0 | 2.62 | 582 | 19.4 | 4.1 | 485 |
| 7 | 11.80 | 2.74 | 582 | 20.9 | 3.99 | 519 |
| 8 | 12.65 | 2.85 | 592 | 23.0 | 4.72 | 522 |
| 9 | 12.17 | 2.74 | 587 | 22.0 | 4.50 | 524 |

The polymer obtained from Run Nos. 4, 5, 7 and 9 were injection molded into test bars for tensile (ASTM D638), flex (ASTM D790), notched Izod (ASTM D256), and heat-deflection temperature (ASTM D648) testing. The test specimens were injection molded at a cylinder temperature of 290° C. and a mold temperature of 100° C. The results of the testing according to ASTM procedures are shown in the following table:

| Polymer of Run No. | Tensile Strength $10^3$ psi | Tensile Modulus $10^6$ psi | Elongation % | Flexural Strength, $10^3$ psi | Flexural Modulus $10^6$ psi | Izod Impact psi | Heat Deflection Temp., °C. |
|---|---|---|---|---|---|---|---|
| 4 | 30.5 | 1.73 | 3.09 | 23.69 | 1.536 | 11.1 | 190 |
| 5 | 29.6 | 1.80 | 2.77 | 24.43 | 1.595 | 11.9 | 185 |
| 7 | 28.79 | 1.85 | 2.62 | 24.15 | 1.574 | 13.1 | 174 |
| 9 | 30.35 | 1.79 | 2.90 | 24.29 | 1.611 | 12.1 | 193 |

EXAMPLE 3

In three runs, a 40-gallon autoclave (constructed of 316 S.S.) equipped with a helix type agitator, solids and liquid addition port, and a distillate take-off column was charged with 24.05 kg of 6-hydroxy-B 2-naphthoic acid and 47.85 Kg of 4-hydroxybenzoic acid. The vessel was alternately evacuated and filled with nitrogen followed by acetic anhydride addition (49.90 Kg, technical grade), as in Example 1. After allowing the monomers to acetylate for 1 hour at 120° to 140° C., the temperature was raised to 200° C. over approximately 1 and ½ hours. Polymerization was conducted between 200° C. and 327° C. over a 3 hour period under nitrogen (10 SCFH) and for 1 and ¼ hours under a vacuum of 10 Torr. The hot polymer was extruded from the reactor and chopped into pellets. The determined polymer properties are summarized below:

| Run No. | I.V. dl/g | Sodium ppm | Potassium ppm | Iron ppm | Color L* | Color b* |
|---|---|---|---|---|---|---|
| 1 | 5.41 | 9 | 10 | 14 | 87.74 | 14.74 |
| 2 | 5.61 | 9 | 10 | 7 | 85.79 | 16.00 |
| 3 | 5.12 | 12 | 10 | 8 | 87.59 | 17.41 |

Monofilaments were then spun using the apparatus described in Example 1 at 320° C. for the polymer obtained from Run Nos. 1 and 2, and at 300° C. for the polymer obtained from Run No. 3. Monofilament testing results were as follows:

| Polymer from Run No. | Through-put g/min | Wind-up speed, meters/ min | Tenacity g/d | Elongation % | Initial Modulus, g/d | Denier per Fil. |
|---|---|---|---|---|---|---|
| 1 | 0.42 | 800 | 12.04 | 2.56 | 598 | 4.56 |
| 2 | 0.42 | 800 | 11.90 | 2.72 | 568 | 5.04 |
| 3 | 0.14 | 210 | 11.6 | 2.63 | 575 | 6.48 |

The monofilaments were then heat treated in a flowing atmosphere of nitrogen at 280° C. for 15 hours. After the heat-treatment, the fiber properties were determined to be as follows:

| Run No. | Tenacity g/d | Elongation % | Initial Modulus, g/d |
|---|---|---|---|
| 1 | 23.4 | 4.77 | 522 |
| 2 | 27.7 | 5.71 | 537 |
| 3 | 24.3 | 5.14 | 520 |

EXAMPLE 4

In this example, several polymerization runs between 6-hydroxy-2-naphthoic acid and 4-hydroxy benzoic acid were made in:

½ liter 304 S.S. flasks
½ liter 316 S.S. flasks
½ liter glassware
½ liter glassware with naphthalene sulfonic acid added
½ liter glassware with ferrous acetate added
½ liter glassware with iron powder added
½ liter glassware with potassium acetate added The general procedure followed was:

The monomers were placed in the vessels, which were evacuated and purged with nitrogen 3 times, and then acetic anhydride was added. The reaction mixture was warmed to 125° C. and held at this temperature for one hour. (Naphthalene sulfonic acid, if utilized, was added as a solution in 1 ml of acetic acid at this time.)

The reactants were warmed to 240° C., over a 30 minute period, to distill off any by-product acetic acid and to initiate polymerization. The polymerization mixture temperature was then raised from 240° C. to 335° C. over a period of 3 hours. At the end of this time, the distillate receiver was removed, the nitrogen purge turned off, and the reaction vessel evacuated to approximately 1 Torr of ½ hour. The polymer was then allowed to cool to room temperature under a nitrogen blanket.

Polymer was recovered from the stainless steel vessels by warming the vessels to a temperature above the melting point of the polymer, and removing a solid plug of polymer when melting begins at the polymer-vessel interface. Polymer was recovered from glassware by breaking the flasks.

The recovered polymer plugs were ground in a Wiley Mill and passed through a 6 mm screen. Ground polymer samples were analyzed by atomic absorption spectroscopy for metals, and were dissolved in pentafluorophenol for inherent viscosity determinations.

When the monomer reactants comprised 0.75 mole of hydroxy benzoic acid and 0.25 mole of hydroxy napthoic acid, the reactant quantities employed were:

103.6 g of 4-hydroxy benzoic acid
47.0 g of 6-hydroxy-2-naphthoic acid, and
104.6 g of reagent grade acetic anhydride (102.5% of stoichiometric)

When the monomer reactants comprised 0.73 mole of hydroxy benzoic acid and 0.27 mole of hydroxy naphthoic acid, the reactant quantities employed were:
- 100.8 g of 4-hydroxy benzoic acid
- 50.8 g of 6-hydroxy-2-naphthoic acid
- 104.6 g of reagent grade acetic anhydride (102.5% of stoichiometric)

Any solid additives employed, i.e., potassium acetate, ferrous acetate, and iron powder, were added to the reaction vessel with the dry, powdered monomers.

The results of the runs are tabulated below:

| Run No. | Vessel | Fe, ppm in polymer | I.V. | Additions | Mole Ratio of hydroxy benzoic acid/ hydroxy naphthoic acid |
|---|---|---|---|---|---|
| 1 | 304 S.S. | 166 | 9.1 | — | 75/25 |
| 2 | " | 158 | 10.3 | — | 75/25 |
| 3 | " | 204 | 8.8 | — | 75/25 |
| 4 | 316 S.S. | 132 | 3.41 | — | 73/27 |
| 5 | " | 101 | 4.24 | — | 73/27 |
| 6 | " | 53 | 2.90 | 100 ppm naphthalene sulfonic acid (NSA) | 73/27 |
| 7 | Glassware | 6 | 2.8 | 0 ppm NSA | 75/25 |
| 8 | " | 5 | 2.6 | 50 ppm NSA | 75/25 |
| 9 | " | 3 | 2.6 | 100 ppm NSA | 75/25 |
| 10 | " | 6 | 2.1 | (Control) | 73/27 |
| 11 | " | 7 | 3.5 | 100 ppm KOAc added | 73/27 |
| 12 | " | 24 | 5.81 | 50 ppm Fe (OAc)$_2$ added | 73/27 |
| 13 | " | 48 | 11.91 | 100 ppm Fe (OAc)$_2$ added | 73/27 |
| 14 | " | 45 | 6.42 | 20 ppm Fe powder added | 73/27 |

As can be seen from the foregoing examples, the I.V. of the aromatic polyester is generally increased when the acetylation/polymerization is conducted in the presence of iron in accordance with the present invention. Particularly good results are obtained when the iron is added, e.g., as iron acetate or iron powder. Note in particular the glassware runs wherein the polymer I.V. was above 5 when the acetylation/polymerization was conducted in the presence of added iron, i.e., Runs 12, 13 and 14.

It has been found, however, that when the polymerization is conducted in the presence of greater than 50 ppm iron, the melt stability of the polymer at higher temperatures, and hence the stability of the properties of the polymer in general, is greatly effected. Thus, in order to obtain a high I.V. polymer which also exhibits good physical properties such as melt stability, it is important to limit the amount of iron employed to no more than about 50 ppm. This is shown in the following example.

EXAMPLE 5

Polymers from Run Nos. 5, 12 and 14 of Example 4 were dried for 3 days at a temperature of 150° C. and 1 Torr. The dried polymer samples were then spun to 5 denier per fil through a 0.007 inch die at a polymer through-put rate of 0.14 g/min. The tenacity of each spun polymer was measured at various temperatures within the temperature range of from 310° to 360° C. to thereby determine the melt stability of the polymer, i.e., how quickly the tenacity deteriorates as temperature is increased. The results are tabulated below:

| Run No. | 5 | 12 | 14 |
|---|---|---|---|
| Polymer I.V. | 4.24 | 5.81 | 6.42 |
| Measured Fe, ppm | 101 | 24 | 45 |
| Melt Temperature, °C. | Tenacity - grams per denier | | |
| 310 | 4.4 | 10.6 | 11.0 |
| 320 | 3.0 | 10.5 | 11.4 |
| 330 | 1.8 | 9.9 | 6.8 |
| 345 | 1.7 | 5.9 | 8.6 |
| 360 | — | 3.7 | 3.5 |

From the foregoing, it can be seen that when less than 50 ppm iron is included in the polymer via addition of iron to the polymerization, the resulting polymer is of high I.V. and high tenacity and also exhibits a fairly stable melt stability. However, when the amount of iron employed is greater than about 50 ppm, e.g., 101 ppm, the melt tenacity of the polymer product is generally not as high and deteriorates very quickly to a very low value with increasing melt temperature.

COMPARATIVE EXAMPLE 1

This example describes the in situ-acetylation of a 70:30 mole ratio of a 4-hydroxy benzoic acid: 6-hydroxy-2-naphthoic acid mixture with an amount of acetic acid anhydride necessary to acetylate the hydroxy benzoic-hydroxy naphthoic acid mixture.

A 300 ml 3-neck glass flask was equipped with a glass paddle stirrer, a claisen adapater, a nitrogen melt, a distillation head, condenser and receiver, and was charged with 48.3 g of 4-hydroxybenzoic acid (0.35 mole) and 28.2 g of 6-hydroxy-2-naphthoic acid (0.15 mole); 0.007 g of sodium acetate was added as a catalyst. The reaction flask was evacuated and purged three times with nitrogen, and then 52 ml (0.55 mole) of acetic anhydride were added to the flask. The distilling condenser was changed to the reflux position and the reactants were heated to 140° C. for 17 hours via an external oil bath. At the end of the reflux preiod the condenser was returned to the distillation position and the reactants were warmed to 250° C. (over a two hour period). 59% of the theoretical acetic acid had distilled when the temperature reached 250° C. Polymerization continued for 1 and ¼ hrs. between 250° and 330° C., and for ¼ hour at 330° C. under vacuum (0.35 Torr). 78.4% of the acetic acid was collected before the vacuum segment of the polymerization. After grinding and acetone extraction, as in the previous examples, the polymer was examined by DSC and solution viscometry. A broad endotherm from approximately 245° C. to 255° C. was found by DSC and the polymers inherent viscosity was only 0.60.

COMPARATIVE EXAMPLE 2

Another polymerization was conducted using the same quantities of monomer, acetic anhydride, and sodium acetate as in Comparative Example 1. The reactants were, as in the previous example, warmed from 140° C. (after 17 hours of reflux) to 250° C. over a 2 hour period (57.6% acetic acid removed). Polymerization was conducted between 250° and 330° C. for 1 and ¼ hours. The pressure in the reaction vessel was reduced to 121 Torr, and polymerization continued at 330° C. for an additional 1 and ¼ hours (86.4% acetic acid removed). During this period, polymer viscosity appeared to increase, then decrease. During further polymerization for 1 and ¼ hour at 330° C. and 0.4 Torr, the viscosity of the polymer again appeared to increase as judged by the tendency of the polymer to form a ball on the stirrer, and by the stringy nature of the melt. After work-up and extraction as in previous examples, this polymer was characterized by DSC and solution viscometry. Two endotherms were found at 260° C. and 275° C. by DSC, and its inherent viscosity was 3.67.

Fibers were spun through a 0.007 in. diameter jet at 330° C., a through-put rate of 0.42 g/min., and a take-up speed of 312 m/min. Fiber properties were:
  8.0 g/d tenacity
  2.02% elongation
  529 g/d initial modulus
  4.06 denier/fil The fiber was heat treated at 275° C. for 15 hours under a flowing atmosphere of nitrogen. The properties increased to 14.6 g/d tenacity, 3.06% elongation, and 501 g/d initial modulus. Another heat treatment for 30 hours at 280° C. gave the following fiber properties: 17.9 g/d tenacity, 3.32% elongation, and 5.29 g/d initial modulus. A second sample of fiber with as-spun properties of 7.9 g/d tenacity; 2% elongation; 574 g/d initial modulus and 3 denier per fil increased to 13.3 g/d tenacity; 3.3% elongation; and, 433 g/d initial modulus under the same conditions of 30 hrs. at 280° C.

COMPARATIVE EXAMPLE 3

This is another example using the same quantities of monomers, acetylating agent (acetic anhydride), and sodium acetate catalyst as in Comparative Examples 1 and 2. As in the previous two comparative examples, the monomers were refluxed in acetic anhydride for 17 hours at 140° C., then the reaction vessel was warmed to 250° C. over a 2 hour period; 70.8% of the theoretical acetic acid had been collected at that time. Additional polymerization between 250° and 330° C. for 1 and ¼ hours produced 89.7% of the theoretical acetic acid. The pressure in the reaction vessel was reduced to 120 Torr, and polymerization was conducted at this pressure for 1 and ½ hours. Further polymerization was conducted at 330° C. and a pressure of approximately 0.6 Torr for a period of 1 and ½ hours. An odor of phenol was present in the distillation condenser, and phenol and phenyl acetate were detected in the distillate by GLPC analysis.

After work-up as in the previous examples, this polymer was found to have an inherent viscosity of 4.0 and a DSC endothermic transition at 250° C.

Fibers were spun at 300° C. through a jet of 0.007 in. diameter. Single filaments collected from spinning at 0.14 g/min. through-put, and wound up at 314 m/min. had the following properties.
  7.2 g/d tenacity
  1.8% elongation
  521 g/d initial modulus
  3.96 denier/fil When this fiber was heat-treated for 30 hours at 280°, the properties increased to 9.8 g/d tenacity, 2.7% elongation, and 416 g/d initial modulus. Another fiber with as-spun properties of 6.1 g/d tenacity; 2.0% elongation; 392 g/d initial modulus; and, 6.7 denier/fil increased to 10.9 g/d tenacity; 3.1% elongation; and 409 g/d initial modulus when heat treated for 30 hours at 280° C.

COMPARATIVE EXAMPLE 4

The same quantities of monomers, acetic anhydride, and sodium acetate used in Comparative Examples 1–3 were employed. The acetylation reaction schedule was as follows: room temperature to 140° C., 1 hr.; acetylation at 140° C., 1 hr.; 140° C. to 330° C., 3 hours; 120 Torr vacuum at 330° C. for 1 hour and 0.45 Torr for an additional hour. Phenol was present in the condenser and the distillate. Fourier Transform Infra-Red (FTIR) found the 4-hydroxy benzoic acid: 6-hydroxy-2-naphthoic acid ratio of this polymer to be 63:37; the monomer charge ratio was 70:30. Its I.V. was only 2.58 and DSC found an endothermic transition at 245° C.

Fibers were spun at 255° C. through a 0.007 inch jet. At a through-put rate of 0.14 g/min. and fiber wind-up speed of 216 m/min., the single fil properties were:
  5.6 g/d tenacity
  1.44% elongation
  515 g/d initial modulus
  5.9 denier/fil

COMPARATIVE EXAMPLE 5

This example is analogous to Cottis, et al, U.S. Pat. No. 3,637,595, Example 1 thereof, in that acetylation via acetic anhydride occurs in the presence of a diluent; the Cottis example used Therminol 77 as the diluent reaction medium while this example employs p-xylene.

The apparatus described in Comparative Example 1 was charged with 57.8 g of 4-hydroxy benzoic acid (0.375 mole) and 23.5 g of 6-hydroxy-2-naphthoic acid (0.125 mole). After evacuating and purging the flask 3 times with nitrogen, 50 ml of p-xylene (Aldrich Chemical, 99+%) and 47.2 ml of acetic anhydride (0.50 mole) were added. The temperature of the reaction flask was raised from room temperature to 120° C. in 30 minutes and maintained at 120° for 30 minutes before raising the bath temperature to 250° over the period of one hour; 81% of the theoretical distillate (xylene+acetic acid) had been removed at such time. Polymerization continued for 3 hours under nitrogen between the temperature of 250° C. and 340° C.

Further polymerization under reduced pressure (2 Torr) was conducted for 1 and ½ hours at 340° C. Weak brittle fibers were removed from the melt via the stirrer, under a blanket of nitrogen.

After grinding and extracting the polymer as in previous examples, its I.V. was 1.46 and DSC found an endothermic transition at 300° C. The polymer was spun at 300° C. at a through-put rate of 0.42 g/min., and monofilaments were wound up at 140 m/min. The monofil properties were:
  2.08 g/d tenacity,
  1.46% elongation,
  182 g/d initial modulus,
  27.0 denier/fil The following Comparative Examples demonstrate the preparation of an aromatic polyester when using acetylated monomers which have been separated from the acetylation reaction mixture and vessel.

COMPARATIVE EXAMPLE 6

To a three-neck, round bottom flask equipped with a stirrer, argon inlet tube, and a heating tape wrapped distillation head connected to a condenser were added the following:

(a) 67.5 g p-acetoxy benzoic acid (0.375 mole), and
(b) 28.7 g 6-acetoxy-2-naphthoic acid (0.125 mole).

The charged flask was vacuum purged with argon three times and brought to a temperature of 250° C. At 250° C. the clear, slightly tinted reaction solution was stirred rapidly under a slow stream of dry argon while acetic acid was distilled from the polymerization vessel. The reaction melt turned opaque with suspended polymer after approximately 9 ml. of acetic acid were collected. The polymerization mixture was stirred for 3 hours at 250° C. About 24 ml. of acetic acid were collected during these stages. The polymerization temperature was next increased to 320° C. The viscous polymer melt was held for 25 minutes at 320° C. under an argon flow and then subjected to a series of reduced pressure stages. The argon flow was halted and the pressure above the stirred polymer melt was reduced to and held at 240 mm. of mercury for about 5 minutes. Over the next 9 minutes the pressure was reduced in stages to about 0.1 to 0.2 mm. of mercury and maintained at this pressure level for about 26 minutes. During these stages the polymer melt continued to increase in viscosity and was stirred more slowly while the remaining acetic acid was removed from the reaction vessel. Upon cooling (i.e., to about 25° C.) the polymer plug was finely ground and dried in a forced air oven at 150° C. for 50 to 60 minutes.

The resulting wholly aromatic polyester (about 65 g) had an inherent viscosity (I.V.) of 5.7 as determined in a pentafluorophenol solution of 0.1 percent by weight concentration at 60° C. The relative viscosity was measured by dividing the flow time in a capillary viscometer of the polymer solution by the flow time for the pure solvent.

When the polymer was subjected to differential scanning calorimetry (DSC), it exhibited a sharp melt endotherm at about 302° C. (peak), which was repeated at about 302° C. on subsequent remelt scans. The polymer melt was thermotropic. When the melt was cooled in the differential scanning calorimeter at a rate of −20° C./min., a sharp polymer crystallization exotherm was observed at about 270° C. (peak).

The polymer was melt extruded into a continuous filament of about 15 denier per filament.

More specifically, the polymer melt while at a temperature of about 310° C., was extruded through a spinneret provided with a single hole jet having a diameter of 20 mils and a length of 100 mils. The extruded filament was quenched in ambient air (i.e. at 72° F. and 65 percent relative humidity). The as-spun filament was taken up at a rate of 150 meters per minute.

The resulting as-spun wholly aromatic polyester fiber exhibited the following average single filament properties:

12.1 g/d tenacity
2.80% elongation
541 g/d initial modulus

Following thermal treatment in a dry nitrogen flow at 250° C. for 90 hours, the fiber exhibited the following average single filament properties:

20 g/d tenacity
5% elongation
550 g/d initial modulus

COMPARATIVE EXAMPLE 7

In five different runs, a 5 gallon autoclave (described in Example 1) was charged with 8.828 Kg of 4-acetoxy benzoic acid and 4.172 Kg of 6-acetoxy-2-naphthoic acid. After evacuating and purging with nitrogen 3 times, a purge of 4 SCFH nitrogen was turned on. 50 ppm of potassium acetate catalyst was added as an acetic acid solution through the liquid additions port and the batch was raised to 190° C. Polymerization was conducted between 190° C. and approximately 305° C. for 3 hours, under atmospheric nitrogen pressure. Vacuum was applied to the autoclave for approximately 30 minutes and the batch temperature rose to approximately 320° C. during this stage of the polymerization.

The polymer was extruded and chopped as described in Example 2; the properties are summarized below:

| Comparative Run No. | I.V. | Sodium ppm | Potassium ppm | Iron ppm |
|---|---|---|---|---|
| 1 | 5.4 | 46 | 94 | 16 |
| 2 | 5.75 | 49 | 100 | 9 |
| 3 | 5.95 | 29 | 73 | 20 |
| 4 | 6.11 | 28 | 80 | 20 |
| 5 | 5.73 | 26 | 70 | 27 |

Average metal contents of comparative examples are:

Na=35.6±11 K=83.4±13 Fe=18.4±7

Calculated metal content from monomer analysis and added catalyst were: sodium, 16 ppm; potassium, 77 ppm; iron, 9 ppm.

Polymer chip was dried (130° C., 24 hrs, 1 Torr) before spinning monofilments from the apparatus described in Example 1. Spinning results were as follows:

| Comparative Run No. | Tenacity g/d | Initial Elongation % | Modulus, g/d | Denier per fil | Spin Temp. | Wind-up Through-put g/min | speed, m/min |
|---|---|---|---|---|---|---|---|
| 1 | 12.4 | 2.70 | 626 | 4.81 | 310 | 0.42 | 800 |
| 2 | 13.4 | 3.28 | 564 | 8.58 | 300 | 0.14 | 262 |
| 3 | 13.5 | 3.14 | 605 | 5.45 | 310 | 0.42 | 680 |
| 4 | 12.7 | 3.02 | 566 | 6.36 | 300 | 0.14 | 260 |
| 5 | 12.2 | 2.95 | 590 | 5.50 | 320 | 0.42 | 680 |

Three of the above fibers were heat treated in a flowing atmosphere of nitrogen for 15 hours at 280° C. The heat-treated fiber properties were:

| Comparative Run No. | Tenacity g/d | Elongation % | Modulus g/d |
| --- | --- | --- | --- |
| 1 | 24.6 | 4.09 | 646 |
| 3 | 23.3 | 3.93 | 645 |
| 5 | 21.3 | 3.66 | 643 |

As can be seen from the foregoing examples, the present invention allows one the economic advantage of in situ acetylation without sacrificing polymer properties such as inherent viscosity which is normally the case in such acetylation processes as demonstrated by Comparative Examples 1–5. Thus, one can obtain a high quality wholly aromatic polyester of hydroxy naphthoic acid and hydroxy benzoic acid via the present invention generally having a I.V. of at least about 5, while avoiding the time consuming and economically disadvantageous steps of esterified monomer isolation or separation.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed:

1. A process for preparing an aromatic polyester comprising reacting at least one hydroxy naphthoic acid and at least one hydroxy benzoic acid with an esterification agent under reaction conditions sufficient to esterify the hydroxy moieties of the hydroxy benzoic acid and hydroxy naphthoic acid, and polymerizing the esterified monomers without separation thereof prior to polymerization, with both the esterification and polymerization being conducted in the presence of from about 5 to about 50 ppm of iron.

2. The process of claim 1, wherein the source of the iron is ferrous acetate or iron powder.

3. The process of claim 2, wherein the amount of iron present is in the range of from about 10 to about 30 ppm.

4. The process of claim 1, wherein the hydroxy naphthoic acid and hydroxy benzoic acid are esterified by reaction with acetic anhydride.

5. The process of claim 4, wherein the amount of acetic anhydride employed in the esterification is from 97.5 percent to about 102.5 percent of stoichiometry.

6. The process of claim 1, wherein the reaction temperature employed in the esterification is in the range of from about 120° to about 150° C.

7. The process of claim 6, wherein the reaction temperature is raised to a temperature in the range of from about 180° to 350° C. upon initiation of the polymerization.

8. The process of claim 1, wherein the polymerization is conducted under melt polymerization conditions.

9. The process of claim 1, wherein 6-hydroxy-2-naphthoic acid is copolymerized with p-hydroxy benzoic acid.

10. A process for preparing a wholly aromatic polyester comprising reacting a hydroxy benzoic acid and a hydroxy naphthoic acid with acetic anhydride under reaction conditions sufficient to acetylate the hydroxy moieties of the hydroxy benzoic acid and hydroxy naphthoic acid, and then raising the temperature of the reaction mixture to a temperature sufficient to initiate polymerization and conducting the polymerization under reaction conditions sufficient to thereby form the aromatic polyester, with both the acetylation and polymerization being conducted in the presence of from about 5 to about 50 ppm of iron.

11. The process of claim 10, wherein the iron is added to the initial reaction mixture prior to acetylation.

12. The process of claim 11, wherein the iron is added in the form of ferrous acetate or iron powder.

13. The process of claim 10 or 11, wherein the amount of acetic anhydride employed in the acetylation is in the range of from about 97.5 percent to about 102.5 percent of stoichiometry.

14. The process of claim 10, wherein 6-hydroxy-2-naphthoic acid and p-hydroxy benzoic acid are reacted.

15. A process for preparing a wholly aromatic polyester comprising reacting 6-hydroxy-2-naphthoic acid and p-hydroxy benzoic acid with from about 97.5 to about 102.5 molar percent of the stoichiometric amount of acetic anhydride in the presence of from about 5 to about 50 ppm of iron under reaction conditions sufficient to acetylate the hydroxy moieties of the hydroxy benzoic acid and hydroxy naphthoic acid, and then raising the temperature of the resulting reaction mixture to a temperature sufficient to initiate polymerization and then conducting the polymerization under reaction conditions sufficient to thereby form an aromatic polyester having an inherent viscosity of at least 5 as determined in pentafluorophenol at 60° C. at a concentration of 0.1 percent by weight.

* * * * *